D. C. RIPLEY.

GLASS CASTER STAND AND MOLD.

No. 10,397. Reissued Oct. 23, 1883.

Witnesses—

W. B. Comm

Jno K. Smith

Inventor—

Daniel C. Ripley by his attys

Bakewell & Kerr.

UNITED STATES PATENT OFFICE.

DANIEL C. RIPLEY, OF PITTSBURG, PENNSYLVANIA.

GLASS CASTER STAND AND MOLD.

SPECIFICATION forming part of Reissue Letters Patent No. 10,397, dated October 23, 1883.

Original No. 278,745, dated June 5, 1883. Application filed September 27, 1883.

*To all whom it may concern:*

Be it known that I, DANIEL C. RIPLEY, of Pittsburg, in the county of Allegheny and State of Pennsylvania, have invented a new and useful Improvement in Glass Caster Stands and Molds; and I do hereby declare the following to be a full, clear, and exact description of the invention, reference being had to the accompanying drawings, forming a part of this specification, in which—

Figure 1:
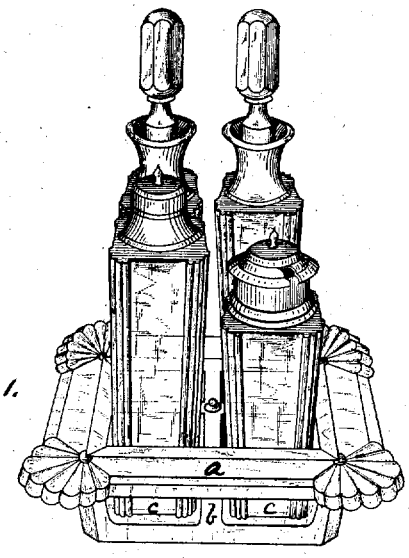
Figure 3:
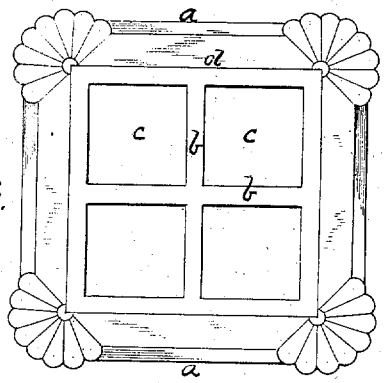
Figure 2:
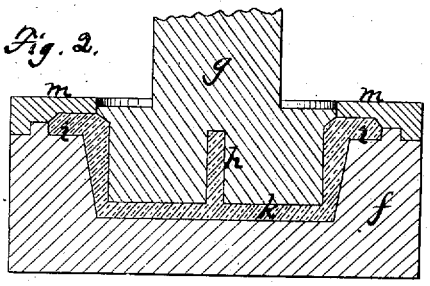

Figure 1 is a perspective view of my improved table-caster. Fig. 2 is a vertical section of the mold and plunger, showing the caster-stand in cross-section. Fig. 3 is a plan view of the caster-stand.

Like letters of reference indicate like parts in each.

The caster-stand *a* is formed like a shallow dish, with partitions *b* connected to the sides and dividing the interior into receptacles *c* for the bottles. It has also a flange, *d*, which extends laterally from its upper edge, and constitutes a handle by which the caster may be lifted. The body *a*, partitions *b*, and flange *d* are integral, constituting one and the same piece of glass. The stand has a flat, or substantially flat, bottom, *e*, by which it rests on the table, and it is formed by pressing in a mold, *f*, of suitable shape, by means of a plunger, *g*, which has lateral cross-slots *h*, to make the partitions *b*. The mold *f* has a recess, *i*, in its upper face, communicating with its central cavity, *k*, which recess extends under the ring *m*, for the purpose of forming the flange-handle *d*.

I do not limit myself to the form of the article shown.

The article thus described makes a cheap and handsome caster-stand, and one which is easily handled and not liable to be overturned.

What I claim as my invention, and desire to secure by Letters Patent, is—

1. A glass mold for making glass caster-stands in one piece, having a lateral recess extending around the mouth, in combination with a ring over said recess and encircling the mouth, and a plunger for forming the same with bottle-receptacles, substantially as and for the purpose described.

2. A glass caster-stand having cavities for receiving the bottles, and a handle-flange extending laterally from the body, substantially as and for the purpose described.

3. A glass caster-stand having cavities for holding the bottles, a flat bottom, and a handle-flange extending laterally from its upper edge, substantially as and for the purpose described.

4. A glass caster, consisting of a shallow dish-shaped stand, having partitions dividing its interior into bottle-receptacles, and caster-bottles normally adapted to fit into said receptacles, substantially as and for the purpose described.

5. A glass caster-stand having its interior divided into receptacles for holding the bottles by integral partitions, and a flat bottom which constitutes the base on which it rests, substantially as and for the purpose described.

In testimony whereof I have hereunto set my hand this 21st day of September, A. D. 1883.

DANIEL C. RIPLEY.

Witnesses:

W. B. CORWIN,

T. B. KERR.